(12) United States Patent
Pare

(10) Patent No.: US 10,479,606 B2
(45) Date of Patent: Nov. 19, 2019

(54) STORAGE SYSTEM

(71) Applicant: Andre Pare, St-Antoine-sur-Richelieu (CA)

(72) Inventor: Andre Pare, St-Antoine-sur-Richelieu (CA)

( * ) Notice: Subject to any disclaimer, the term of this patent is extended or adjusted under 35 U.S.C. 154(b) by 406 days.

(21) Appl. No.: 15/309,667

(22) PCT Filed: Feb. 17, 2016

(86) PCT No.: PCT/CA2016/000038
§ 371 (c)(1),
(2) Date: Nov. 8, 2016

(87) PCT Pub. No.: WO2016/131123
PCT Pub. Date: Aug. 25, 2016

(65) Prior Publication Data
US 2018/0072500 A1  Mar. 15, 2018

(30) Foreign Application Priority Data

Feb. 19, 2015 (GB) .................................. 1502792.3

(51) Int. Cl.
*B65G 1/16* (2006.01)
*B65G 1/04* (2006.01)

(52) U.S. Cl.
CPC ............. *B65G 1/16* (2013.01); *B65G 1/0442* (2013.01)

(58) Field of Classification Search
CPC .................................. B65G 1/16; B65G 1/0442
(Continued)

(56) References Cited

U.S. PATENT DOCUMENTS 365,389 A * 6/1887 Koegel .................. A47G 25/10
                                                    211/30
456,175 A * 7/1891 Van Orman ........... A47G 25/12
                                                    211/63
(Continued)

FOREIGN PATENT DOCUMENTS

CH          706067 A2    11/2011
CN         2619894 Y     6/2004
(Continued)

OTHER PUBLICATIONS

Written Opinion of the International Searching Authority issued by the World Intellectual Property Organization dated May 30, 2016 for PCT application PCT/CA2016/000038 from which the present application claims priority.
(Continued)

*Primary Examiner* — Jonathan Liu
*Assistant Examiner* — Devin K Barnett

(57) ABSTRACT

A storage system (10) for storing an elongated object (26) in a substantially vertical orientation relative to a ground surface (13), the storage system including a rack (11), the rack (11) including a supporting structure (30), a first member (14) supported by the supporting structure (30) above the ground surface (13) and a second member (12) supported by the supporting structure (30) above the ground surface (13) higher than the first member (14); a first mounting element (22) securable to both the elongated object (26) and to the first member (14) together to mount the elongated object (26) to the first member (12); and a second mounting element (20) securable to both the first mounting element (22) and to the second member (12) together.

12 Claims, 8 Drawing Sheets

(58) Field of Classification Search
USPC ..... 211/60.1, 63, 70.5, 70.3, 70.8, 183, 113, 211/182, 86.01; 248/636, 638, 220.21, 248/309.1, 317, 205.1
See application file for complete search history.

(56) References Cited

U.S. PATENT DOCUMENTS

| | | | | |
|---|---|---|---|---|
| 869,959 A * | 11/1907 | Bryant | E06C 1/56 | 182/196 |
| 896,295 A * | 8/1908 | Haines | E06C 1/345 | 182/196 |
| 1,027,672 A * | 5/1912 | Sime | A47G 25/743 | 211/119 |
| 1,240,365 A * | 9/1917 | Plumb | A01F 25/12 | 211/125 |
| 1,591,973 A * | 7/1926 | Grossheim | A63B 69/205 | 482/87 |
| 1,924,096 A * | 8/1933 | Adams | A47B 63/02 | 211/46 |
| 2,070,507 A * | 2/1937 | Bishop | A47F 7/0021 | 312/290 |
| 2,246,081 A * | 6/1941 | Van Nattan | A47F 7/12 | 211/60.1 |
| 2,576,005 A * | 11/1951 | Ferrary | D03C 3/40 | 139/90 |
| 2,687,270 A * | 8/1954 | Robinson | F16F 1/362 | 248/565 |
| 2,714,965 A * | 8/1955 | Fitzkee | A47G 25/743 | 211/113 |
| 2,749,072 A * | 6/1956 | Long | E06B 9/264 | 248/214 |
| 2,919,032 A * | 12/1959 | Sinawski | A63C 11/007 | 211/70.5 |
| 2,953,626 A * | 9/1960 | Somes, Jr. | H02G 5/06 | 174/99 B |
| 2,966,991 A * | 1/1961 | Duffner | B65G 1/02 | 211/60.1 |
| 3,006,591 A * | 10/1961 | Somes, Jr. | H02G 5/025 | 248/317 |
| 3,227,503 A * | 1/1966 | Fletcher | A47F 7/0021 | 312/234 |
| 3,338,422 A * | 8/1967 | Hickok | A63C 11/028 | 211/70.5 |
| 3,385,451 A * | 5/1968 | Anderson | A47F 7/0021 | 211/60.1 |
| 3,477,585 A * | 11/1969 | Adams | A47B 81/00 | 211/60.1 |
| 3,521,848 A * | 7/1970 | Ase | A63B 7/02 | 248/205.1 |
| 3,537,595 A * | 11/1970 | Mathisen | A47B 81/005 | 211/70.8 |
| 3,630,392 A | 12/1971 | Cintract et al. | | |
| 3,685,667 A * | 8/1972 | Bell | A63C 11/007 | 211/70.5 |
| 3,715,100 A * | 2/1973 | Spencer | B60P 3/32 | 254/49 |
| 3,848,747 A * | 11/1974 | Thompson | A47B 47/027 | 211/194 |
| 3,887,078 A | 6/1975 | Jay | | |
| 3,917,201 A * | 11/1975 | Roll | A47B 13/02 | 248/550 |
| 3,990,665 A * | 11/1976 | Joussemet | A47B 43/006 | 248/243 |
| 4,000,818 A | 1/1977 | Schmid | | |
| 4,044,895 A | 8/1977 | Adams, Jr. | | |
| 4,061,092 A * | 12/1977 | Jacobsen | A47B 43/006 | 108/149 |
| 4,078,708 A * | 3/1978 | Mayer | B60R 9/12 | 211/70.5 |
| 4,121,720 A * | 10/1978 | Hayes | A47F 5/0892 | 211/113 |
| 4,223,792 A | 9/1980 | Aspen | | |
| 4,239,436 A * | 12/1980 | Wildenaur | B65G 1/06 | 198/766 |
| 4,291,812 A * | 9/1981 | Harmes | A47B 57/54 | 211/182 |
| 4,318,518 A * | 3/1982 | Davis | E21F 17/02 | 248/60 |
| 4,340,144 A * | 7/1982 | Cousins | A47F 5/083 | 211/106 |
| 4,476,984 A * | 10/1984 | Garrett | E06C 7/14 | 211/86.01 |
| 4,561,547 A * | 12/1985 | Estwanik, III | A47B 81/00 | 211/113 |
| 4,561,549 A * | 12/1985 | Yokohori | A47D 15/00 | 211/172 |
| 4,684,091 A * | 8/1987 | Moreschi | F16M 11/046 | 211/182 |
| 4,807,763 A * | 2/1989 | Jankovsky | A47G 25/12 | 211/60.1 |
| 4,850,261 A * | 7/1989 | Greene | F16F 15/0275 | 91/362 |
| 4,863,020 A * | 9/1989 | Klemow | A47F 5/0876 | 206/702 |
| 5,025,935 A * | 6/1991 | Hadachek | B63C 11/02 | 211/60.1 |
| 5,090,653 A * | 2/1992 | Theodorides | F16B 43/00 | 248/300 |
| 5,111,943 A * | 5/1992 | Ramey | G09F 7/00 | 211/59.4 |
| 5,156,451 A * | 10/1992 | Pollock | G07F 9/10 | 248/616 |
| 5,285,995 A * | 2/1994 | Gonzalez | G05D 19/02 | 248/550 |
| 5,297,685 A * | 3/1994 | Ramey | G09F 7/00 | 211/41.15 |
| 5,316,155 A * | 5/1994 | Collins | A47B 81/005 | 211/106.01 |
| 5,326,204 A * | 7/1994 | Carlson | A47B 96/1466 | 211/183 |
| 5,346,076 A * | 9/1994 | Hart | A47F 7/0021 | 211/49.1 |
| 5,360,309 A * | 11/1994 | Ishiguro | B08B 9/42 | 414/404 |
| 5,405,111 A * | 4/1995 | Medlin, Jr. | H02G 3/125 | 248/205.1 |
| 5,477,968 A * | 12/1995 | Largent | A47B 81/00 | 211/204 |
| 5,487,473 A * | 1/1996 | Ford | A47F 5/0876 | 211/181.1 |
| 5,522,633 A * | 6/1996 | Massi | B66C 1/10 | 294/67.32 |
| 5,526,941 A * | 6/1996 | Ford | A47F 5/0869 | 211/103 |
| 5,653,070 A * | 8/1997 | Seguin | F16F 15/02 | 248/621 |
| 5,657,881 A * | 8/1997 | Fourel | A47F 5/0006 | 211/60.1 |
| 5,678,348 A * | 10/1997 | Zielinski | A01K 97/08 | 211/70.8 |
| 5,749,479 A * | 5/1998 | Belokin | A47F 5/0892 | 211/113 |
| 5,837,922 A | 11/1998 | Maher et al. | | |
| 5,889,648 A * | 3/1999 | Heavirland | H02B 1/32 | 174/50 |
| 6,109,459 A * | 8/2000 | Downey | A47B 81/005 | 211/70.8 |
| 6,116,164 A * | 9/2000 | Justen, Jr. | A47B 43/006 | 108/42 |
| 6,138,976 A * | 10/2000 | Fahringer, Sr. | A01K 97/10 | 211/70.8 |
| 6,164,465 A * | 12/2000 | Schroeder | A47B 43/00 | 211/85.7 |
| 6,199,839 B1 * | 3/2001 | Rienzo | F16F 15/02 | 267/136 |
| 6,221,452 B1 * | 4/2001 | Ban | B60K 20/04 | 428/36.91 |

(56) References Cited

U.S. PATENT DOCUMENTS

| | | | | |
|---|---|---|---|---|
| 6,487,071 B1* | 11/2002 | Tata | ............. | G11B 33/08 |
| | | | | 235/487 |
| 6,530,170 B1* | 3/2003 | Sweeney | ............. | A01K 97/10 |
| | | | | 211/70.8 |
| 6,659,316 B2* | 12/2003 | Fleming | ............. | F41B 13/04 |
| | | | | 224/0.5 |
| 7,063,299 B2* | 6/2006 | Facey | ............. | F16G 11/14 |
| | | | | 248/317 |
| 7,249,924 B2 | 7/2007 | Ehrenleitner et al. | | |
| 7,314,205 B2* | 1/2008 | Pickens | ............. | H02B 1/52 |
| | | | | 248/507 |
| 7,441,669 B1* | 10/2008 | Dalbey | ............. | A47F 7/0028 |
| | | | | 211/85.7 |
| 7,699,122 B2* | 4/2010 | Eriksen | ............. | E21B 19/14 |
| | | | | 175/52 |
| 7,789,249 B1* | 9/2010 | Merbeth | ............. | A47G 1/12 |
| | | | | 211/87.01 |
| 7,866,592 B2* | 1/2011 | Taylor | ............. | A47F 7/005 |
| | | | | 211/85.5 |
| 7,871,045 B2* | 1/2011 | Moore | ............. | F16M 13/027 |
| | | | | 248/188.1 |
| 7,874,435 B2* | 1/2011 | Olivier | ............. | B08B 9/055 |
| | | | | 211/70.4 |
| 7,926,766 B2* | 4/2011 | Tjerrild | ............. | F16L 3/227 |
| | | | | 248/317 |
| 7,954,654 B1* | 6/2011 | Hoyt | ............. | F41B 5/14 |
| | | | | 211/60.1 |
| 8,231,299 B2* | 7/2012 | Klauer | ............. | A47F 5/0018 |
| | | | | 211/183 |
| 8,240,490 B2* | 8/2012 | Malekmadani | ............. | A47B 57/10 |
| | | | | 211/188 |
| 8,800,788 B1* | 8/2014 | Guidry | ............. | A01K 97/10 |
| | | | | 211/70.8 |
| 8,870,135 B2* | 10/2014 | Grubbs | ............. | F16L 3/24 |
| | | | | 248/200 |
| 8,967,392 B1* | 3/2015 | Czamara | ............. | F16M 11/00 |
| | | | | 211/26 |
| 8,991,780 B2* | 3/2015 | Pedersen | ............. | B65D 90/0033 |
| | | | | 108/57.12 |
| 8,998,010 B1* | 4/2015 | Kennedy | ............. | A47B 47/0091 |
| | | | | 211/115 |
| D741,438 S * | 10/2015 | Wright, III | ............. | D22/107 |
| 9,181,764 B2 | 11/2015 | Hu | | |
| 9,291,304 B1* | 3/2016 | Tu | ............. | F16M 13/02 |
| 9,333,926 B1* | 5/2016 | Henning | ............. | B60R 11/06 |
| 9,995,365 B1* | 6/2018 | Kim-Whitty | ............. | E04F 15/06 |
| 10,183,209 B1* | 1/2019 | Orenstein | ............. | A63B 71/0036 |
| 2001/0005961 A1* | 7/2001 | Fukuta | ............. | B65G 1/02 |
| | | | | 52/167.3 |
| 2003/0173480 A1* | 9/2003 | Thurman | ............. | B65D 88/06 |
| | | | | 248/201 |
| 2003/0205907 A1* | 11/2003 | Casteran | ............. | B65D 85/20 |
| | | | | 294/67.3 |
| 2004/0227047 A1* | 11/2004 | Arakawa | ............. | A47F 5/0006 |
| | | | | 248/317 |
| 2005/0000928 A1* | 1/2005 | Calleja | ............. | B65G 1/00 |
| | | | | 211/183 |
| 2005/0042063 A1 | 2/2005 | Ehrenleitner | | |
| 2005/0194331 A1* | 9/2005 | Chang | ............. | A47B 81/00 |
| | | | | 211/60.1 |
| 2005/0199569 A1* | 9/2005 | Calleja | ............. | A47F 7/0021 |
| | | | | 211/189 |
| 2005/0252871 A1* | 11/2005 | Le Roux | ............. | B25H 3/04 |
| | | | | 211/70.6 |
| 2006/0011566 A1* | 1/2006 | Guy | ............. | A47B 81/005 |
| | | | | 211/60.1 |
| 2006/0207952 A1* | 9/2006 | Timmons | ............. | A47F 5/0892 |
| | | | | 211/85.3 |
| 2007/0029271 A1* | 2/2007 | Belokin | ............. | A47F 5/0892 |
| | | | | 211/113 |
| 2007/0095768 A1* | 5/2007 | Huo | ............. | A47B 45/00 |
| | | | | 211/113 |
| 2007/0119794 A1* | 5/2007 | Hidaka | ............. | H05K 7/1495 |
| | | | | 211/26 |
| 2007/0138158 A1* | 6/2007 | Young | ............. | B23K 37/02 |
| | | | | 219/158 |
| 2007/0163972 A1* | 7/2007 | Sopel | ............. | B60P 7/08 |
| | | | | 211/60.1 |
| 2008/0022610 A1* | 1/2008 | Gjelsvik | ............. | E04H 9/02 |
| | | | | 52/167.3 |
| 2009/0184077 A1* | 7/2009 | Curet | ............. | A45D 44/04 |
| | | | | 211/117 |
| 2009/0199504 A1* | 8/2009 | Thompson | ............. | E04B 2/7457 |
| | | | | 52/699 |
| 2010/0108626 A1* | 5/2010 | Sorensen | ............. | A01K 97/08 |
| | | | | 211/70.8 |
| 2011/0017561 A1* | 1/2011 | Tanaka | ............. | E04B 1/985 |
| | | | | 188/378 |
| 2011/0049074 A1* | 3/2011 | Woolard | ............. | B65G 1/02 |
| | | | | 211/191 |
| 2011/0226715 A1* | 9/2011 | Schwartzkopf | ............. | A47B 96/061 |
| | | | | 211/87.01 |
| 2011/0272544 A1* | 11/2011 | Smith, III | ............. | E04B 1/003 |
| | | | | 248/220.21 |
| 2011/0278428 A1* | 11/2011 | Raye | ............. | B60T 7/20 |
| | | | | 248/674 |
| 2011/0310724 A1* | 12/2011 | Martino | ............. | G11B 33/128 |
| | | | | 369/263.1 |
| 2012/0032042 A1* | 2/2012 | Kotrla | ............. | A62B 35/0068 |
| | | | | 248/205.1 |
| 2013/0313387 A1* | 11/2013 | Ly | ............. | F16M 13/02 |
| | | | | 248/205.3 |
| 2013/0320172 A1* | 12/2013 | Skorupa | ............. | B60P 7/0823 |
| | | | | 248/309.1 |
| 2014/0110547 A1* | 4/2014 | Consaul | ............. | F16M 13/00 |
| | | | | 248/231.9 |
| 2014/0265772 A1* | 9/2014 | Newman | ............. | A47B 81/005 |
| | | | | 312/237 |
| 2015/0076088 A1* | 3/2015 | Zuritis | ............. | H02S 20/10 |
| | | | | 211/41.1 |
| 2015/0108301 A1* | 4/2015 | Troy | ............. | B25H 3/00 |
| | | | | 248/206.5 |
| 2015/0115122 A1* | 4/2015 | Townsend, Jr. | ............. | F16M 13/02 |
| | | | | 248/317 |
| 2015/0225212 A1* | 8/2015 | Avila | ............. | B66C 23/44 |
| | | | | 414/800 |
| 2015/0259982 A1* | 9/2015 | Maragliano | ............. | E06C 7/505 |
| | | | | 182/107 |
| 2015/0305498 A1* | 10/2015 | Sue | ............. | G01D 11/30 |
| | | | | 211/60.1 |
| 2016/0143437 A1* | 5/2016 | Gabriel | ............. | A47B 81/005 |
| | | | | 224/153 |
| 2016/0178120 A1* | 6/2016 | Mizrahi | ............. | F24F 13/32 |
| | | | | 248/327 |
| 2017/0231389 A1* | 8/2017 | Sekine | ............. | A47B 97/00 |
| | | | | 248/636 |
| 2018/0072500 A1 | 3/2018 | Pare | | |
| 2019/0152700 A1* | 5/2019 | Pruskauer | ............. | E04G 21/16 |

FOREIGN PATENT DOCUMENTS

| | | |
|---|---|---|
| FR | 2931808 | 12/2009 |
| GB | 869195 | 5/1961 |
| JP | H07228471 A | 8/1995 |
| WO | 1988010225 | 12/1988 |

OTHER PUBLICATIONS

International Search Report issued by the World Intellectual Property Organization dated May 30, 2016 for PCT application PCT/CA2016/000038 from which the present application claims priority.

* cited by examiner

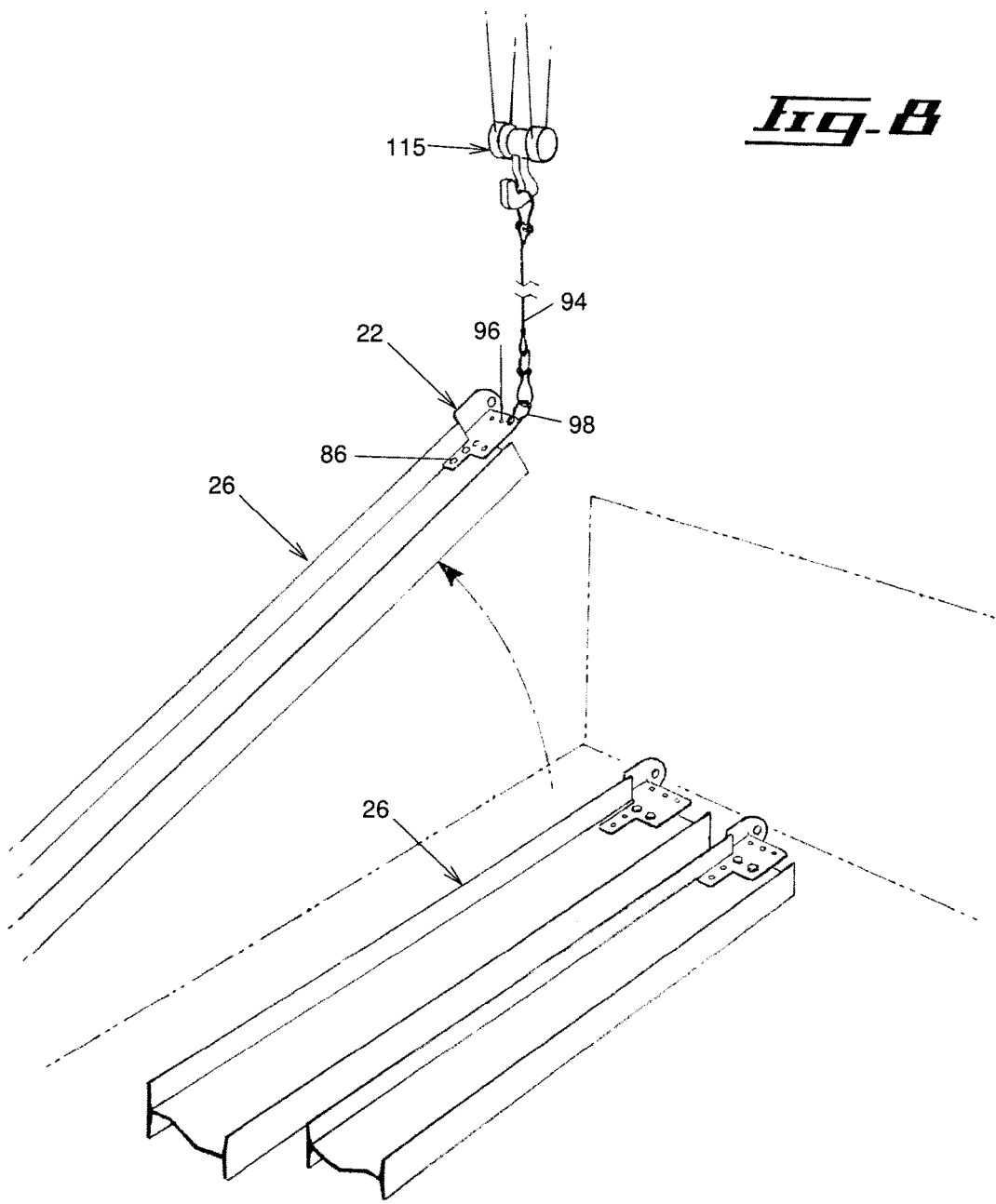

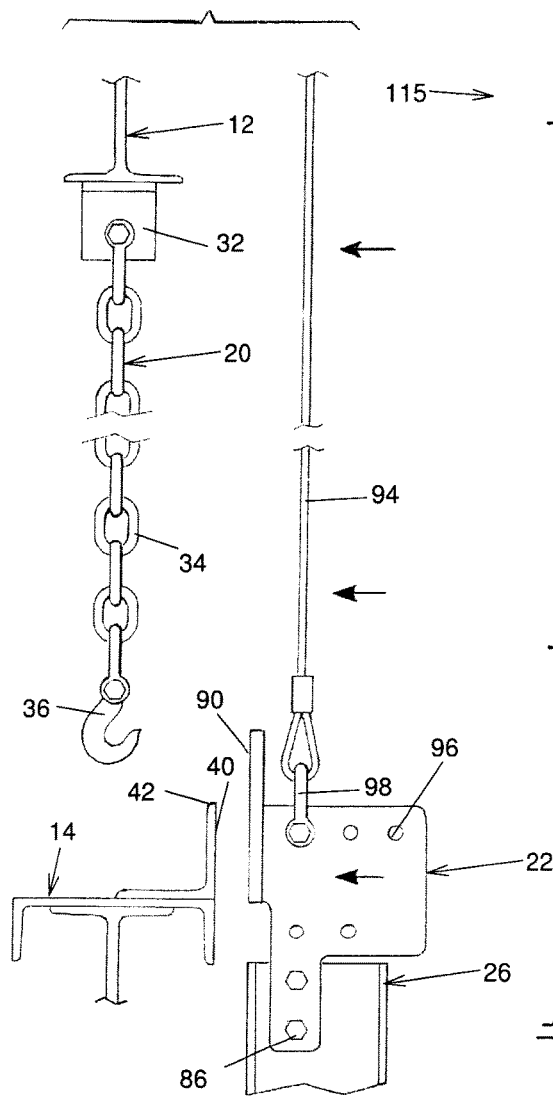
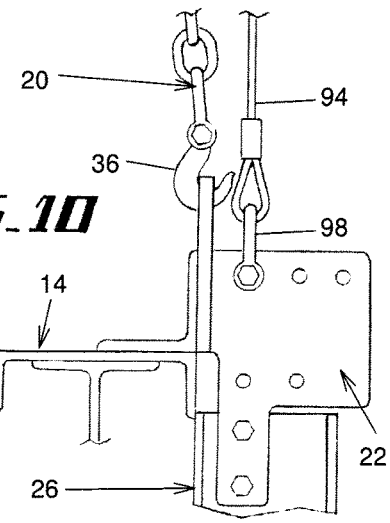
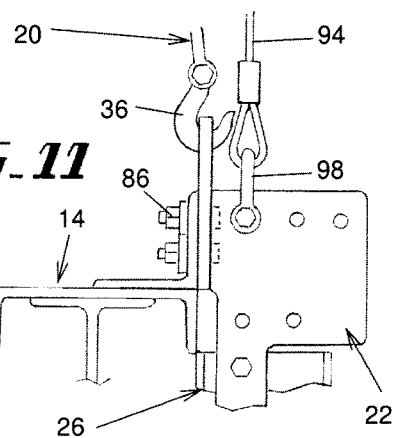
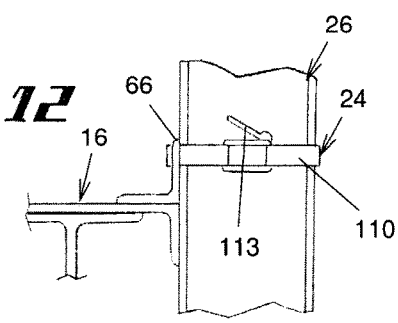

STORAGE SYSTEM

FIELD OF THE INVENTION

The present invention relates generally to storage systems and, more particularly, to a storage system and method for storage of elongated objects.

BACKGROUND

Storage rack systems for elongated items, or objects, are known in the art and are useful for storing, organizing and displaying a multiplicity of relatively long and heavy structural members such as, for examples, elongated H-beams, angle irons, C-channels, square or round tubing and the likes.

Typical prior art storage rack systems for elongated items can vary in size and complexity, from the simple pair of wooden transverses laid on the floor on which are horizontally piled up the elongated items, to the multi-stage horizontal or vertical static racking structures, and to the more complex rack structure comprising vertically spaced and horizontally slidable drawers for storing the elongated items. Heavy elongated items are generally stored and retrieved from these prior art storage rack systems using single-hook or double-hook overhead cranes.

While these prior art devices generally offer a storage rack system for storage of elongated items, they also entail one or more of the following disadvantages. First, their method of storing elongated items, in horizontally disposed piles or in upright stacks, does not offer a clear and concise view of each individual items stored in inventory. Also, their method of storing elongated items also generally does not provide a direct and unobstructed access to each individual items, which often results in time consuming operations to reach and retrieve a selected item in the middle or bottom of a pile. In addition, their method of handling and storing elongated items also often results in safety concerns for the material handling personnel, as well as a high risk of damage to the outer surfaces of the stored items. For example, it is not uncommon that a pile of horizontally disposed H-beams inadvertently tumbles down and spreads laterally. The horizontal disposition of the stored elongated items generally requires a relatively expensive and cumbersome double-hook crane to properly and safely handle the horizontally disposed elongated items in and out of the storage system. Otherwise, when a single-hook crane is used, its point of attachment must be located almost above the balance point of the horizontal load, which is also often the source of safety concerns in industrial working environments.

These storage systems also generally occupy a substantial amount of floor space and are generally not well adapted to store relatively shorter than average items since these items usually cause unbalance or bending of adjacent elongated items when stored in the middle of a horizontal pile of similar items. These shorter than average items are often sent to a recycling process, which is not necessarily the most environmentally friendly solution.

Some storage rack systems comprise horizontally movable drawers, but they are often complex and expensive to produce.

In view of the above, there is a need in the industry for an improved storage rack system.

An object of the present invention is to provide such a storage rack system.

SUMMARY OF THE INVENTION

In a broad aspect, the present invention provides a storage system for storing an elongated object in a substantially vertical orientation relative to a ground surface, the storage system comprising: a rack, the rack including a supporting structure, a first member supported by the supporting structure above the ground surface and a second member supported by the supporting structure above the ground surface higher than the first member; a first mounting element securable to both the elongated object and to the first member together to mount the elongated object to the first member; and a second mounting element securable to both the first mounting element and to the second member together.

The invention may also provide a storage system wherein the second mounting element includes an elongated and flexible element removably attachable to the first mounting element.

The invention may also provide a storage system wherein the elongated and flexible element includes a chain.

The invention may also provide a storage system wherein the second mounting element includes a tension adjuster for adjusting a tension in the elongated and flexible element when the first mounting element is secured to the second mounting element and to the first member.

The invention may also provide a storage system wherein the tension adjuster includes a flexible element mounting bracket, the elongated and flexible element being secured to the flexible element mounting bracket, and a fastener securing the flexible element mounting bracket to the second mounting element, tension being applied to the elongated element by fastening the fastener to vary a distance between the flexible element mounting bracket and the second member.

The invention may also provide a storage system wherein the tension adjuster includes a variable length element provided along the elongated and flexible element.

The invention may also provide a storage system further comprising a third member supported by the supporting structure above the ground surface lower than the first member and a third mounting element securable to both the elongated object and to the third member together to mount the elongated object to the third member.

The invention may also provide a storage system wherein the third mounting element includes a flexible tying element for tying the elongated object to the third member.

The invention may also provide a storage system wherein the third member includes a third member abutment surface for abutting the elongated object there against when the flexible tying element ties the elongated object to the third member.

The invention may also provide a storage system wherein the third member defines a pair of spaced apart slots for inserting the tying element thereinto.

The invention may also provide a storage system wherein the first mounting element includes a mounting bracket defining first, second and third portions, the first portion being configured and sized to be releasably attached to the first member and to the second mounting element, the third portion being configured and sized to be releasably attached to the elongated object and the second portion extending between the first and third portions.

The invention may also provide a storage system wherein the second portion defines a hoisting aperture for securing a hoist thereto.

The invention may also provide a storage system wherein the third portion defines at least one fastening aperture for receiving a fastener therethrough to fasten the third portion to the elongated object.

The invention may also provide a storage system wherein the first portion defines an anchoring aperture and the first member defines an anchoring slot, the anchoring slot and apertures being in register with each other when the elongated object is stored to allow fastening of the mounting bracket to the first member with a fastener.

The invention may also provide a storage system wherein the first portion defines an anchoring slot and the first member defines an anchoring aperture, the anchoring slot and apertures being in register with each other when the elongated object is stored to allow fastening of the mounting bracket to the first member with a fastener.

The invention may also provide a storage system wherein the second and third portions are defined together by single first plate and the first portion is defined by a second plate extending perpendicularly to the first plate.

The invention may also provide a storage system wherein the supporting structure includes substantially vertically extending columns supporting the first and second members.

The invention may also provide a storage system wherein the first and second members are substantially elongated and horizontally extending.

The invention may also provide a storage system further comprising a catwalk extending substantially adjacent to the first member.

In another broad aspect, the invention provides a storage system and beams assembly supported on a ground surface, the assembly comprising: a rack, the rack including a plurality of support columns, a first member supported substantially horizontally by the support columns above the ground surface and a second member supported by the support columns substantially horizontally above the ground surface higher than the first member; a plurality of elongated beams positioned in a substantially vertical orientation relative to the ground surface; a plurality of mounting brackets each removably attached to one of the elongated beams and to the first member; and a plurality of elongated flexible elements each secured to the second member and each removably attached to one of the mounting brackets.

The invention may also provide an assembly further comprising a third member supported by the support columns substantially horizontally above the ground surface lower than the first member and a plurality of flexible tying elements each tying a respective one of the elongated beams to the third member.

The invention may also provide an assembly further comprising a plurality of tension adjusters each between the second member and a respective one of the mounting brackets to selectively adjust tension in the elongated flexible elements.

Advantageously, the present invention is a storage system and method which may provide a clear and concise view of each individual elongated object stored in inventory, which allows a rapid, economical and safe access to each individual elongated object in inventory, thus greatly reducing time, costs and safety concerns associated with storage and retrieval operations, compared to conventional storage systems, and whose method of handling and storing elongated objects in a substantially upright attitude reduces the risk of damaging the elongated objects during storage and retrieval operations.

In addition, in some embodiments, the present invention provides a relatively simple and secure method of handling and storing elongated objects that also reduces the risk of injuries by material handling personnel, which can save a substantial amount of floor space and whose ability to store elongated objects of a very wide variety of lengths allows for a reduction of the number of relatively short elongated objects that are typically sent to recycling and, thus, is more environmentally friendly than conventional storage systems. In addition, by storing vertically the elongated objects, objects having many different lengths can be stored easily one beside the other, which can facilitate storage of such elongated objects having many different lengths, for example in the steel beam production industry.

The present invention also provides a system and method of releasably securing elongated objects to the storage rack using multiple points of attachment that provide additional safety measures for preventing an accidental or a wrongly intended release of an elongated object from the rack structure and whose load configuration applied to the storage rack provide increased stability to the supporting structure of the storage system. In some embodiment, the storage system is relatively simple and economical to produce and assemble.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 8, in a partial perspective view, illustrates a first step in the attachment of the H-beam of FIG. 6 to the rack storage system of FIG. 1;

FIG. 9, in a partial side elevation view, illustrates a second step in the attachment of the H-beam of FIG. 6 to the rack storage system of FIG. 1;

FIG. 10, in a partial side elevation view, illustrates a third step in the attachment of the H-beam of FIG. 6 to the rack storage system of FIG. 1;

FIG. 11, in a partial side elevation view, illustrates a fourth step in the attachment of the H-beam of FIG. 6 to the rack storage system of FIG. 1;

FIG. 12, in a partial side elevation view, illustrates a fifth step in the attachment of the H-beam of FIG. 6 to the rack storage system of FIG. 1;

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Figure 1:
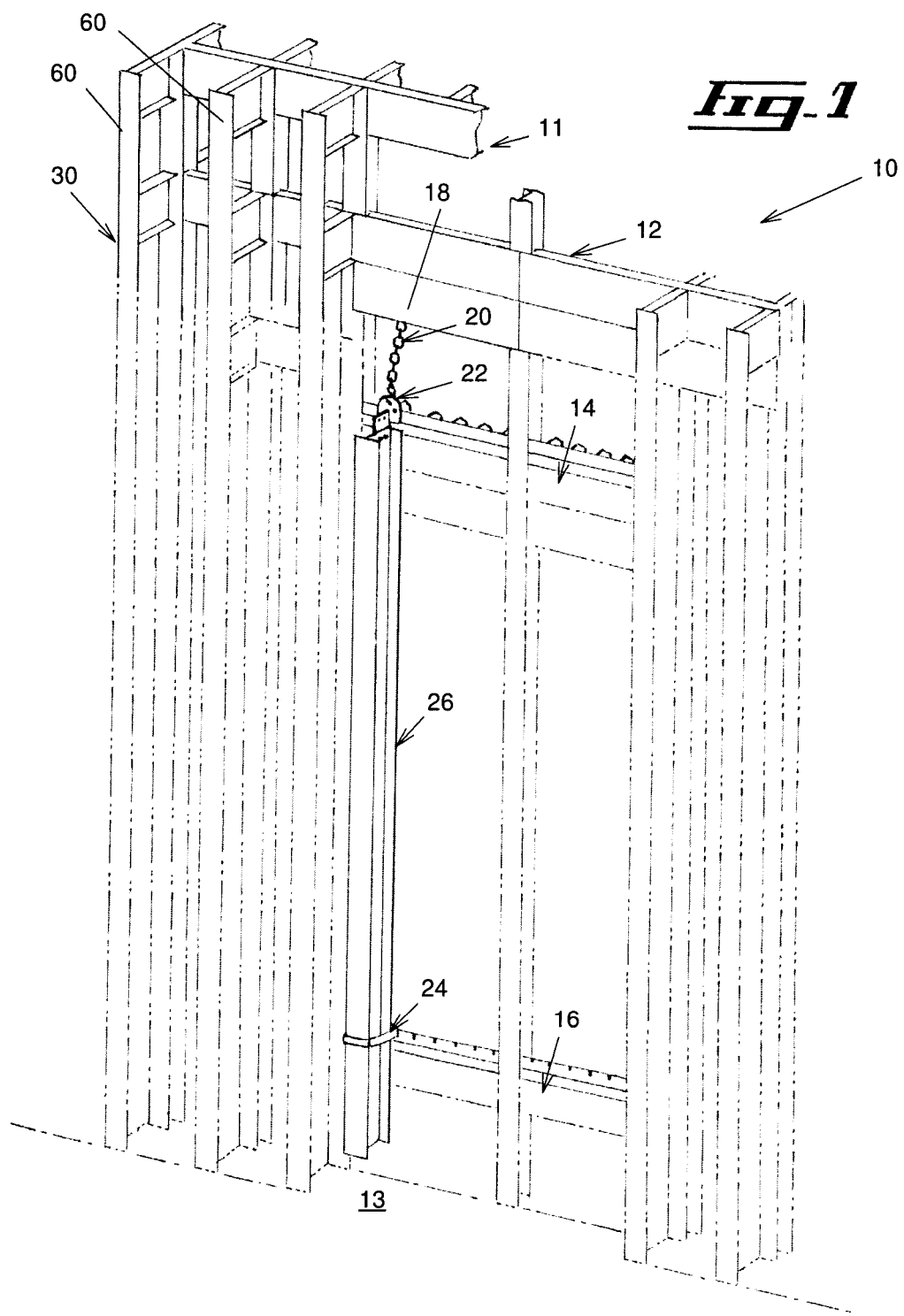
FIG. 1, in a perspective view, illustrates a storage system in accordance with an embodiment of the present invention.
Figure 2:
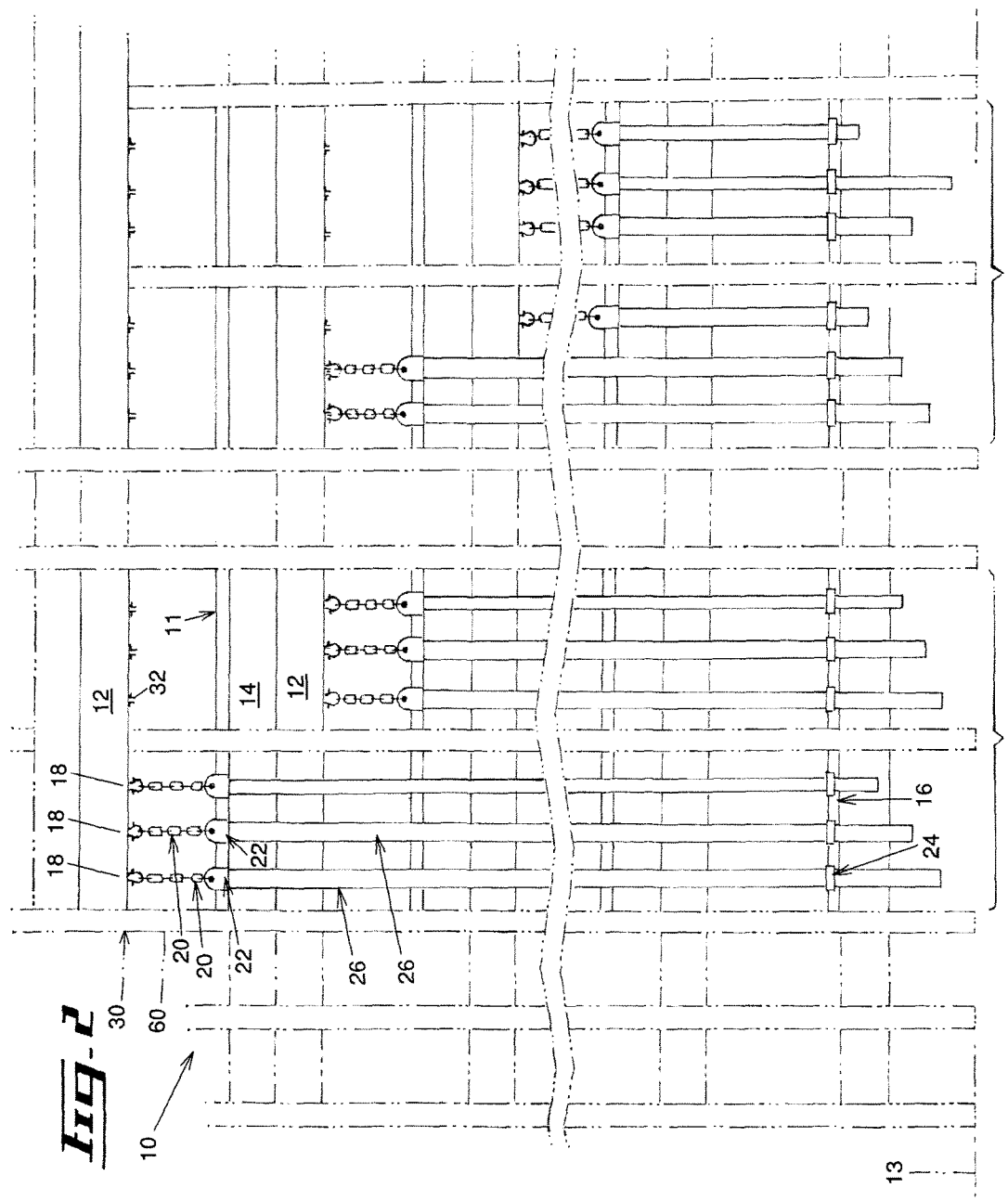
FIG. 2, in a fragmented front elevation view, illustrates the storage system of FIG. 1 onto which are vertically anchored a plurality of elongated elements in the form of elongated H-beam members.

FIGS. 1 and 2 illustrates an embodiment of a storage system 10 according to the present invention for storing one or more elongated objects 26 in a substantially vertical orientation relative to a ground surface 13. The storage system 10 generally includes a rack 11, a first mounting element and second mounting element. The rack 11 typically includes a supporting structure 30, a first member supported by the supporting structure 30 above the ground surface 13 and a second member supported by the supporting structure 30 above the ground surface 13 higher than the first member 14. The first mounting element is securable to both the elongated object 26 and to the first member together to mount the elongated object 26 to the first member, the second mounting element is securable to both the first mounting element and to the second member together.

In the present embodiment, the first and second members are represented respectively by upper support member 14 and auxiliary support member 12. While in some embodiments the rack 11 only includes one of each of the upper support member 14 and auxiliary support member 12, the rack 11 typically includes a plurality of auxiliary support members 12 and a plurality of upper support members 14 provided pairwise.

Also, typically, the rack 11 includes a third member supported by the supporting structure 30 above the ground surface 13 lower than the first member and a third mounting element securable to both the elongated object 26 and to the third member together to mount the elongated object to the third member. In the present embodiment, the third member is represented by a lower support members 16. As can be observed in FIG. 2, there may be a plurality of pairs of auxiliary and upper support members 12 and 14 that are vertically spaced apart above a single lower support member 16.

At least one, but typically a plurality of horizontally spaced apart, vertical storage positions 18 may be defined along the auxiliary, upper and lower support members 12, 14 and 16, and vertically encompassing the latter. At each one of the vertical storage positions 18, there is provided one of the first and second mounting elements, which are respectively in the form of a mounting bracket 22 and auxiliary support 20. When present, the third mounting element may take for example the form of a flexible tying element 24 for tying the elongated object 26 to the lower support member 16. The mounting bracket 22, auxiliary support 20 and flexible tying element 24 are cooperatively used to position and firmly secure the elongated object 26 abutting, in a substantially vertical attitude, against the upper and lower support members 14 and 16, within a designated vertical storage position 18.

Typically, the auxiliary, upper and lower support members 12, 14 and 16 are substantially elongated and horizontally extending beams made of a suitably rigid material such as, for example, a heavy gauge metal. However, in other embodiments, any first, second and third member that allow attachment of the elongated object are within the scope of the invention.

The horizontal auxiliary, upper and lower support members 12, 14 and 16 may be adapted to be rigidly attached to a supporting structure 30 including a plurality of substantially upright columns 60, or the like, using any suitable means such as, for examples, a welding process, threaded fastener and nut combinations, or the likes. In other embodiments, the upper and lower support members 12, 14 and 16 extend integrally from the supporting structure 30

In some embodiments, the auxiliary support member 12 has longitudinally spaced apart, along an underside portion thereof, a plurality of suitable attachments 32 provided at an upper end of one auxiliary support 20, each aligned with one of the vertical storage positions 18.

Now referring more particularly to FIG. 9, auxiliary support 20 also includes a substantially elongated link element 34 having a first end thereof pivotally attached to one of the attachments 32, and a second end thereof attached to a conventional hook 36 or similar element allowing removable attachment to the mounting bracket 22. Elongated link element 34 may be represented by an elongated and flexible element of suitable strength such as, for examples, a metal link chain (as shown), a metal cable link, a flat nylon strap, or the like. In other embodiments, the elongated link element 34 may as well be represented by a more rigid elongated link element such as an elongated rod or flat bar provided with suitable eyelet means at each end thereof.

Figure 14:
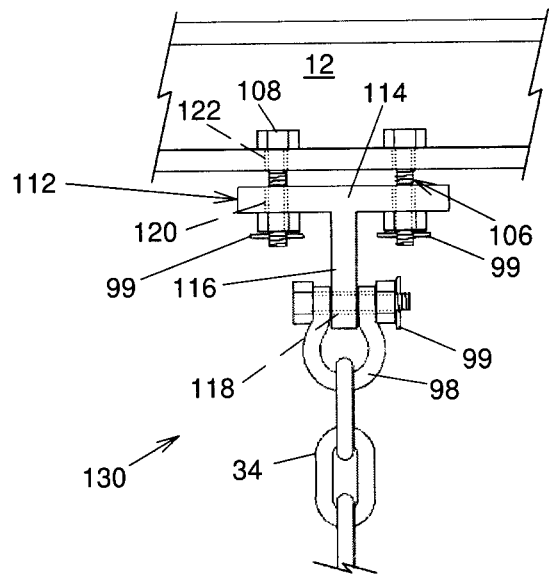
FIG. 14, in a side elevation view, illustrates a tension adjuster usable in the storage system of FIG. 1.

In some embodiments, as seen in FIG. 14, an alternative auxiliary support 130 may further include a tension adjuster 106 for adjusting a tension in the elongated link element 34 when the latter is secured to the auxiliary support member 12 and to the mounting bracket 22 (not shown in FIG. 14). The tension adjuster 106 includes a flexible element mounting bracket 112, replacing the attachment 32, the elongated link element 34 being secured to the flexible element mounting bracket 112 through a suitable coupling means such as, for example, a U-link and bolt combination 98, the bolt being secured in place by a lock pin 99 in some embodiments. One or more fasteners 108 secure the flexible element mounting bracket 112 to the elongated link element 34. Tension is applied to the elongated link element 34 by fastening the fastener(s) 108 to vary a distance between the flexible element mounting bracket 112 and the auxiliary support member 12.

For example, the flexible element mounting bracket 112 includes first and second plates 114 and 116 perpendicular to each other. The first plate defines an aperture 118 for attaching the elongated link element 34 thereto. The second plate is substantially parallel to the undersurface of the auxiliary support member 12 and defines fastener receiving apertures 120 receiving the fasteners 108 thereinto, the fastener receiving apertures 120 being in register with corresponding fastener receiving apertures 122 extending through the auxiliary support member 12. The tension adjuster 106 includes one or more threaded fasteners 108 and nuts 109 pairs, four being present in the embodiment of FIG. 14. Each fastener 108 extends through the flexible element mounting bracket 112 and through a suitably shape portion of the auxiliary support member 12. The nuts 109 are for example fixed to the flexible element mounting bracket 112, for example through welding. By screwing or unscrewing the threaded fasteners 108 relative to the nuts 109, tension can be respectively applied and released in the elongated link element 34. In some embodiments, lock pins 99 are inserted through the fasteners 108 to prevent unintended complete removal of the fasteners 108 from the nuts 109.

Figure 15:
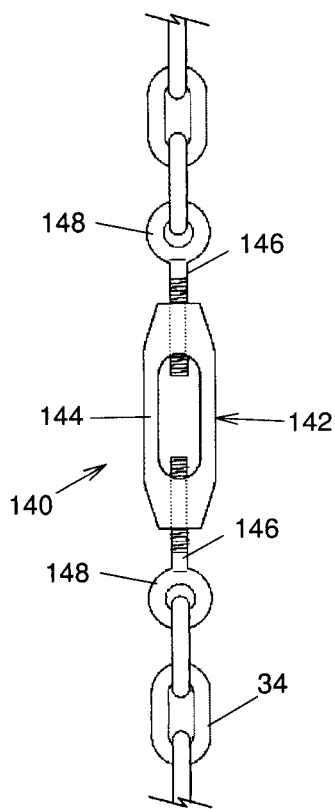
FIG. 15, in a side elevation view, illustrates another tension adjuster usable in the storage system of FIG. 1.

In yet other embodiments, a tension adjuster 140 seen in FIG. 15 includes a variable length element 142 provided along the elongated link element 34 and separating the latter into two sections that can be spaced apart by a variable distance. The variable length element 142 may include a body 144 through which are screwed longitudinally opposed threaded rods 146 terminated by loops 148, which are attached to the elongated link element 34.

Figure 16:
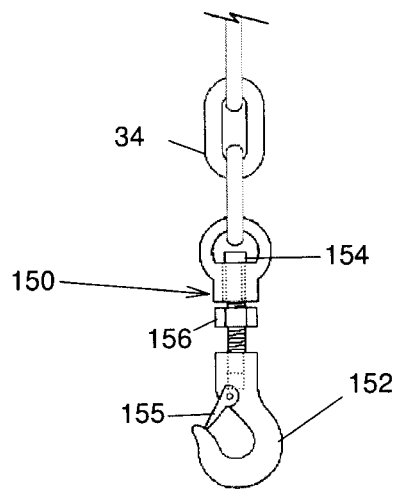
FIG. 16, in a side elevation view, illustrates yet another tension adjuster usable in the storage system of FIG. 1.

In yet other embodiments, a tension adjuster 150 seen in FIG. 16, is inserted between the elongated link element 34 and the hook 152, which is shown here as having a safety latch 155. The tension adjuster 150 once again uses a threaded fastener 154 inserted through a nut 156 that is fixed to a body 158 through which the threaded fastener 154 also extends and changes a length of the tension adjuster 150 similarly to the manner in which length is changed in the tension adjusters 106 and 140.

When present, the tension adjuster allows easy attachment and detachment of the hook 36 and 152 to and from the mounting bracket 22, when tension is released. When tension is applied, stability of the storage system 10 is greatly increased by tension in the auxiliary support 20. Then, minor disturbances, such as wind pressure, small earthquakes or accidental shocks to the storage system 10 have less chances of causing catastrophic oscillations increasing in amplitude, which could eventually collapse the whole storage system 10.

Figure 3:
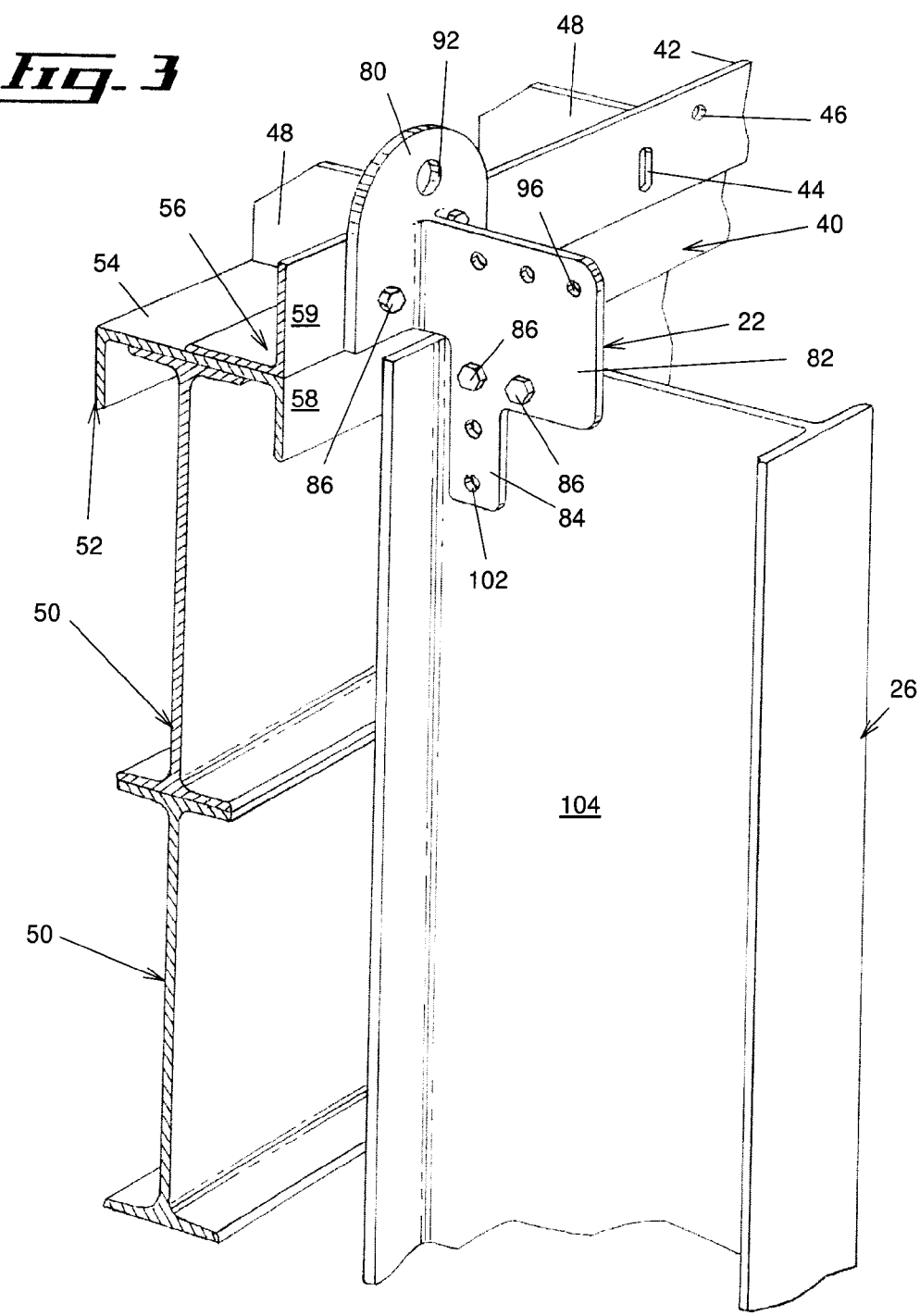
FIG. 3, in a perspective view, illustrates of the anchoring of one of the elongated H-beam members of FIG. 2, at the upper end thereof, to a member of the storage system.

FIG. 3 best illustrates an example of an upper support member 14 that is generally represented by a horizontally disposed elongated member defining a longitudinal abutment face 40 facing the elongated objects 26 top store. The upper portion of the longitudinal abutment face 40 is generally defined by an upwardly extending, longitudinal flange 42 that is provided with at least one, but typically a plurality of horizontally spaced apart pairs of adjacent anchoring holes, namely, a vertically oriented, anchoring slot hole 44, and a substantially round anchoring hole 46. The relative disposition between the pair of anchoring holes 44, 46 is such that the upper portion of the anchoring slot hole 44 is substantially horizontally aligned with the adjacent, round anchoring hole 46. As will be described more below, the pair of anchoring holes 44, 46 are suitably positioned to align with corresponding anchoring holes provided in mounting bracket 22, which will be described more below.

The number and positions of pairs of anchoring holes 44 and 46, thus longitudinally disposed along the flange 42, preferably vertically correspond in number and positions with the auxiliary supports 20 downwardly extending from the underside of the auxiliary support member 12 described above.

In some embodiments, a plurality of reinforcement elements such as, for example, transversally disposed plate members 48, join an interior surface portion of the flange 42 with the top surface portion of the upper support member 14, thus securing the relative right angle configuration between them. The reinforcement plate members 48 are for example transversally welded in place at roughly a mid position between adjacent anchoring holes 44, 46 within a pair, thus maximizing the reinforcement characteristic of the plate members 48 where it is most efficient, horizontally centered within each vertical storage positions 18.

FIG. 3 shows an example of upper support member 14 in a perspective, cross-sectional view in which the member is shown generally represented by a pair of superposed H-beam members 50 whose top upper longitudinal portion is covered with a downwardly opening C-channel member 52. In turn, the C-channel member 52 has an edge portion of its top surface 54 covered with an elongated angle iron member 56. The thus aligned side surface portions 58 and 59 of the C-channel member 52 and the angle iron member 56 respectively, cooperatively form the substantially planar, longitudinal abutment face 40.

Furthermore, the superposed H-beams 50, the C-channel and the angle iron members 52 and 56 are rigidly attached to one another using a welding process, for example, thus forming a support member offering substantially rigid characteristics by advantageously integrating cost effective standard structural members.

It is to be understood that any other equivalent structural assembly of the upper support member 14, which offer comparable or superior support characteristics, may be used.

It is further to be noted that the auxiliary support member 12 and the upper support member 14 described above are typically represented by suitably rigid elongate members that are characterized in that they may individually support the weight of at least one, but typically a plurality, of elongated objects 26 for which the storage system 10 is designed. For example, as a safe measure, a horizontal portion of the upper support member 14 disposed between two adjacent upright columns 60 of the supporting structure 30, may be sufficiently rigid to support the weight of a predetermined number of elongated objects 26, with each elongated object having a maximum weight and length compatible with the storage system 10. The predetermined number of elongated objects 26 may correspond to the number of vertical storage positions 18 provided along the concerned horizontal portion of the upper support member 14.

Figure 7:
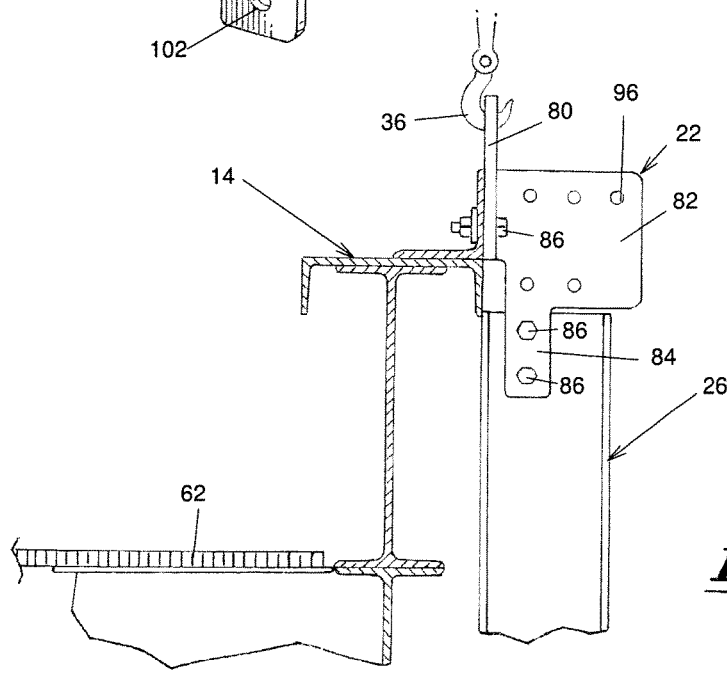
FIG. 7, in a side elevation view, illustrates the mounting bracket and H-beam member of FIG. 6 mounted to the member shown in FIG. 3.

In some embodiments, as shown in FIG. 7, there is provided a suitably sized and positioned catwalk 62 that is longitudinally disposed along a side portion of the upper support member 14, opposite the vertical storage positions 18 of the storage system 10. The catwalk 62 may conform to applicable personnel safety measures in the industry, and is used by material handling personnel to assist the overhead crane operator in positioning and anchoring and de-anchoring elongated objects 26 in the vertical storage positions 18 of the storage system 10. For safety reasons, the catwalk 62 is for example represented by a floor structure offering an anti-slip or anti-skid surface such as checkered plate, a metal grid, or the like. Access to the catwalk 62 may be provided by any suitable conventional means such as ladders, staircases or elevators (not shown).

Figure 4:
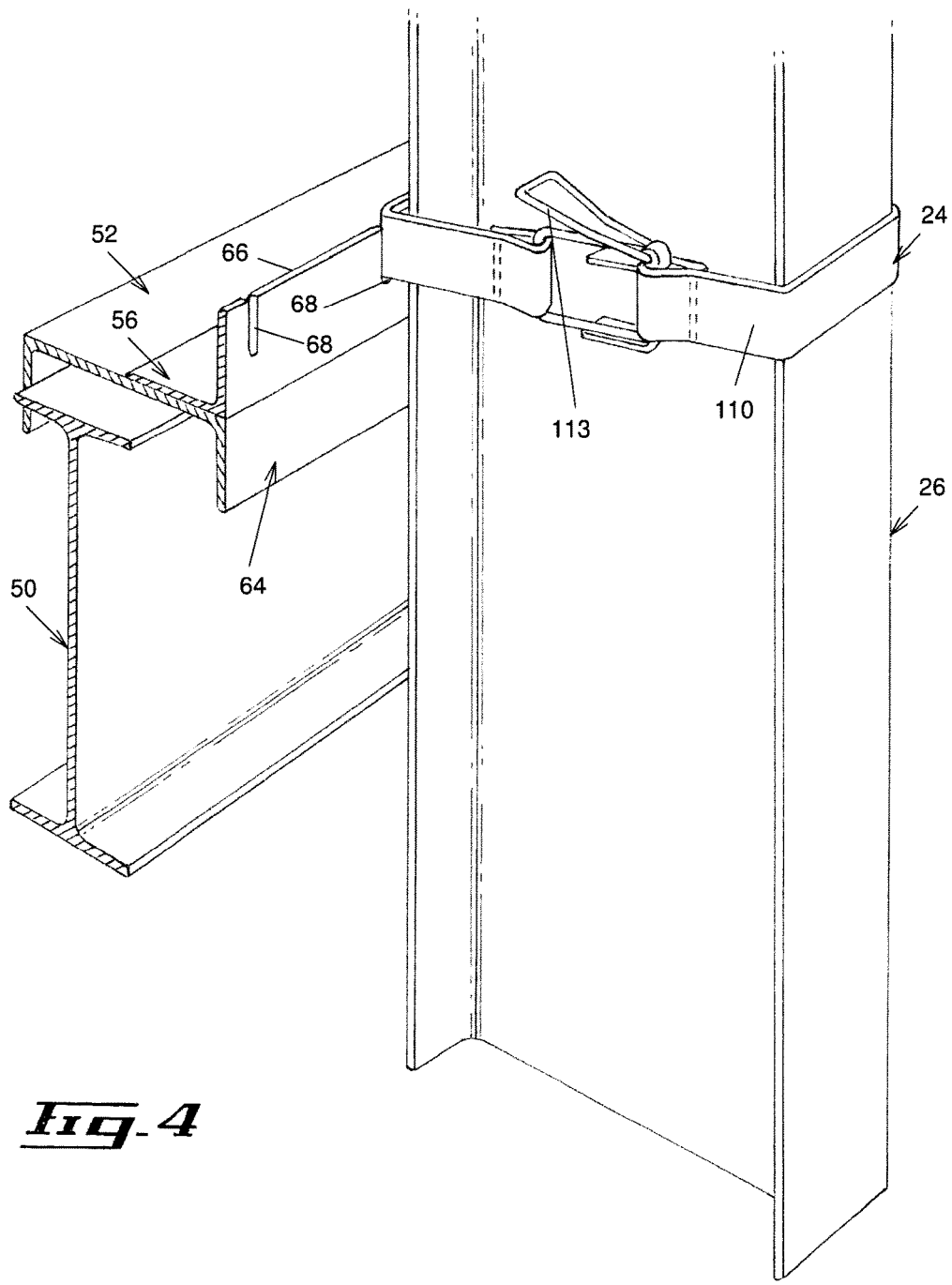
FIG. 4, in a perspective view, illustrates of the attachment of one of the elongated H-beam members of FIG. 2, at the lower end thereof, to another member of the storage system.

FIGS. 1, 2 and 4 best illustrate a lower support member 16. As seen for example in FIG. 4, likewise upper support member 14, the lower support member 16 is generally represented by a horizontally disposed elongated member defining a longitudinal abutment face 64 for abutting the elongated object 26 there against when the flexible tying element 24 ties the elongated object 26 to the lower support member 16. It should be noted that in some embodiments the lower support member 16 is omitted and that the lower end of the elongated member 26 is then supported in any other suitable manner.

The upper portion of the longitudinal abutment face 64 is generally defined by an upwardly extending, longitudinal flange 66 that is provided with at least one, but typically a plurality of pairs of adjacent, elongated open slots 68 downwardly extending from the upper edge of the flange 66. The number and positions of paired open slots 68 thus longitudinally disposed along the flange 66 typically vertically correspond in number and positions with the anchoring holes 44 and 46 disposed along the flange 42 of the upper support member 14 described above. The minimum horizontal distance between two open slots 68, within a pair, typically slightly exceeds the maximum transversal width of an intended elongated object 26 to be stored at a corresponding vertical storage position 18. The open slots 68 are suitably sized and shaped to freely slidably receive therein a substantially flat cross-section portion of a flexible tying element 24, which will be further described hereinbelow.

As shown in FIG. 4, lower support member 16 represents a structural assembly that is closely similar to the upper support member 14 described above, except that it may include only one H-beam member 50, and the pairs of anchoring holes 44, 46 are replaced by pairs of open sots 68. Likewise the upper support member 14, it is to be understood that any other equivalent structural assembly of the lower support member 16 offering comparable or superior support characteristics may be used. Furthermore, likewise upper support member 14, there may be provided a catwalk suitably disposed along a side portion of the lower support member 16, opposite the vertical storage positions 18 of the lower support member 16.

A plurality of parallelly disposed pairs of horizontal support members composed of an auxiliary support member 12 and an upper support member 14, may be vertically spaced apart at suitable positions above a single lower support member 16 to allow the accommodation of various lengths of elongated objects 26, as shown in FIG. 2. It is to be noted that an inverse configuration (not shown) is as well possible wherein a plurality of parallelly disposed lower support members 16 that are vertically spaced apart at suitable positions under a single pair composed of an auxiliary support member 12 and an upper support member 14, may as well allow the accommodation of various lengths of elongated objects 26.

Optionally, conventional cushioning elements (not shown) such as suitably sized rubber pads, or the like, may be fastened or glued to the longitudinal abutment faces 40 and 64 of the upper and lower support members 14 and 16 respectively, in order to protect the elongated objects 26 from having there outer surfaces being damaged when accidentally bumped against the storage system 10.

Figure 5:
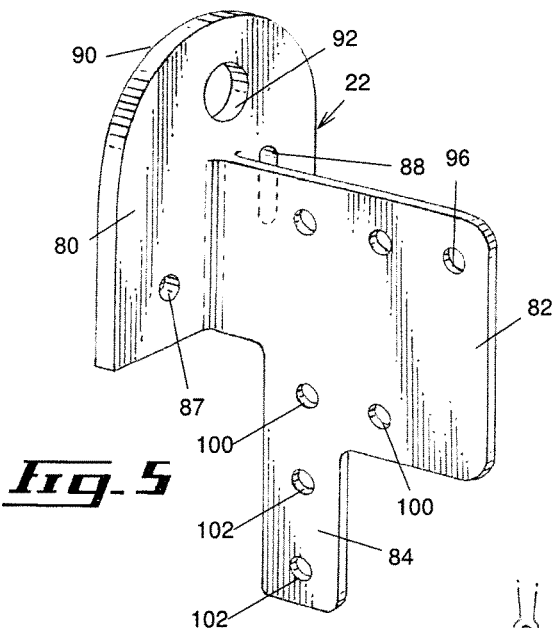
FIG. 5, in a perspective view, illustrates a mounting bracket part of the storage system of FIGS. 1 to 4.

FIGS. 3 and 5 best show one embodiment of the mounting bracket 22. Referring to FIG. 5, this mounting bracket 22 is represented by a one piece element that is generally defined as having a first portion 80, a second portion 82 and a third portion 84, the second portion 82 extending between the first and third portions 80 and 84. Second and third portions 82 and 84 are represented for example by a single plate perpendicularly extending from a mid portion of a second plate representing first portion 80.

First portion 80 is configured and sized to be releasably attached in the storage system 10 concurrently through threaded fastener and nut combinations 86 between first portion 80 and an upper support member 14, and through the auxiliary support 20 between first portion 80 and an auxiliary support member 12 (as best illustrated in FIG. 1). Thus, a round anchoring hole 87 and a vertically oriented, anchoring slot hole 88 are provided on either side of the perpendicularly extending second portion 82. The length of the anchoring slot hole 88 is substantially equivalent to the the length of anchoring slot hole 44 provided through the flange 42 of the upper support member 14. The relative disposition between the pair of anchoring holes 87 and 88 is such that the round anchoring hole 87 is substantially horizontally aligned with the bottom portion of the anchoring slot hole 88.

Furthermore, the disposition of the anchoring holes 87 and 88 is such that when the outer surface 90 of first portion 80 is abutted against a vertical storage position 18 along the longitudinal abutment face 40 of an upper support member 14, the round anchoring hole 87 is encompassed by the corresponding anchoring slot hole 44 through flange 42 of the upper support member 14, while the vertical anchoring slot hole 88 of the mounting bracket 22 encompasses a corresponding round anchoring hole 46 through flange 42.

This particular opposite disposition of the corresponding pairs of anchoring round and slot holes 44, 46 and 87, 88 respectively, allows a vertical movement of the mounting bracket 22 relative to the static upper support member 14. The purpose of this relative vertical movement will be demonstrated through a description of the method of usage of the storage system 10 described below.

The first portion 80 is also configured and sized to be releasably attached to the auxiliary support 20. To that effect, for example, a hooking hole 92 is provided proximal the upper end of first portion 80 to allow the hook 36 of the auxiliary support 20 to be engaged therein, as best exemplified through in FIGS. 10 and 11.

Figure 13:
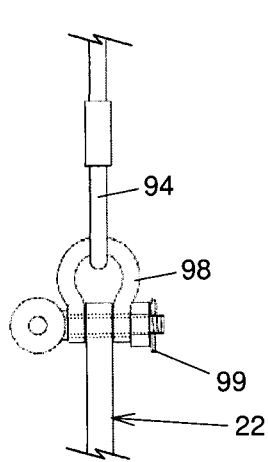
FIG. 13, in a side elevation view, illustrates an alternative manner of attaching a hoist to a mounting bracket.

Second portion 82, which may generally represent an intermediate portion between first and third portion 80 and 84, is adapted to be releasably hooked up, or otherwise attached to a suitable hoist means such as the distal end of a hoist cable 94 of an overhead crane 115, or the like (as shown in FIGS. 8 and 9). A conventional, single hook hoist means may be used for the general maneuvering and transport of elongated objects 26 equipped with the mounting bracket 22, to and from the storage system 10. Second portion 82 is provided with one or more of hoisting apertures 96, for example distributed horizontally along an upper edge thereof, for coupling the distal end of a hoist cable 94 to the mounting bracket 22 through a suitable coupling means such as, for example, a U-link and bolt combination 98, the bolt being secured by a nut, or by a lock pin 99, as seen in FIG. 13. Returning to FIGS. 8 and 9, the horizontal distribution of the hoisting apertures 96 along the upper edge of second portion 82 allow the coupling of the hoist cable 94 to a position that is closest to the upright center of gravity of the elongated object 26.

Referring to FIG. 5, the third portion 84 defines a downwardly extending portion relative to second portion 82 that is adapted to be releasably fastened to the upper end of an elongated object 26 through a selected number of fastening apertures 100 and 102 extending through the third portion 84. Fastening apertures 100 are horizontally spaced apart from each other, while fastening apertures 102 are vertically spaced apart from each other. The fastening apertures 100 and 102 may be disposed and sized to align with corresponding apertures provided in the elongated object 26, for example standard apertures provided in steel beams used in the commercial and industrial building industry.

Figure 6:
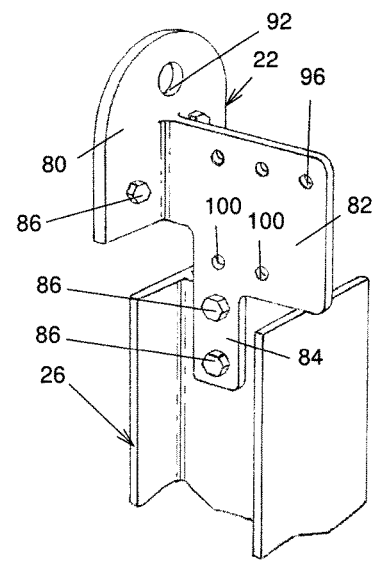
FIG. 6, in a perspective view, illustrates the mounting bracket of FIG. 5 fastened to the upper end an alternative H-beam member.

More specifically, in some embodiments, the third portion 84 is suitably shaped and sized to be fastened to an end of an elongated object 26 having an axially and centrally extending flat portion 104 such as, for examples, an H-beam, an elongated iron flat bar, or the like. For examples, horizontally disposed fastening apertures 100 may be used to fasten the mounting bracket 22 to an H-beam member having a relatively wide flat portion 104, as illustrated in FIG. 3, while the vertically disposed fastening apertures 102 may be used to fasten the mounting bracket 22 to a H-beam member having a relatively narrow flat portion 104, as illustrated in FIGS. 6 and 7.

Although third portion 84 has been described as being adapted to be fastened to an elongated object 26 having a centrally extending flat portion 104, such as the center portion of an H-beam or the like, it is to be understood that third portion 84 may as well be suitably shaped and sized to be fastened to elongated objects 26 having differently shaped cross-sections. For examples, third portion 84 may have a square, or rounded cross-section adapted to be inserted in, and fastened to the distal end of an elongated object having a square or a rounded hollow cross-section respectively (not shown). Other cross-section configurations of third portion 84 are, of course, possible such as, for examples, triangular, hexagonal, octagonal, and the like, for ease of fastening in a substantially centered and balanced fashion to a correspondingly shaped end of an elongated object 26.

It is furthermore to be noted that an elongated object 26 stored in the storage system 10 may as well represent an elongated container such as, for example, an elongated cylindrical container for storing a liquid or a dry granular material, or may represent an elongated and relatively narrow shelf rack for storing compatibly sized elongated objects.

Although mounting bracket 22 as been heretofore described as a one piece element, it is to be understood that it may as well be represented by an equivalent assembly of suitable elements that are rigidly fastened to one another using any suitable means such as threaded fasteners, a welding process, or the like.

It is to be noted that the auxiliary support 20 is of a suitable length such that when an elongated object 26, such as the H-Beam illustrated in the drawings, is solely suspended through the auxiliary support 20, the anchoring holes 87, 88 of the mounting bracket 22 are substantially aligned with the corresponding anchoring holes 44, 46 of the upper support member 14.

As best illustrated in FIG. 4, an example of a flexible tying element 24 generally consists of a flexible belt 110 and buckle 113 combination. The flexible belt element 110 is preferably represented by a substantially elongated and flat element that may be made of any suitable flexible material of sufficient strength such as, for examples, woven nylon, a natural fabric, leather, or the likes. The buckle 113 is for example made of a suitably rigid and rust proof material such as, for example, a metal subjected to a rust-proof treatment.

Thus, the system and method of releasably securing elongated objects 26 to the storage system 10 using multiple points of attachment provide substantially fail-safe safety measures for preventing an accidental or a wrongly intended release of an elongated object 26 from the rack structure.

In a manner readily apparent to one skilled in the art of storage systems, a method of usage of the storage system 10 of the present invention is as follows. To mount an elongated object 26 such as, for example, an elongated H-beam member, at a desired storage position in the storage system 10, a mounting bracket 22 is first fastened at an end of the elongated object 26 using suitably sized threaded fastener and nut combinations 86. If not already provided for, suitable apertures may have to be bored through a portion of the elongated object 26, proximal its distal end thereof, to allow the fastening of the mounting bracket 22 to the elongated object 26.

As illustrated in FIG. 8, the end of a hoist cable 94 from an overhead crane 115, or the like, is then coupled to the mounting bracket 22 using, for example, a U-link and bolt combination 98. The elongated H-beam 26 thus coupled to the overhead crane 115 is then lifted from the ground in a substantially upright attitude and brought proximal a desired vertical storage position 18 in the storage system 10 such that the outer surface 90 of the first portion 80 of mounting bracket 22 is oppositely facing the longitudinal abutment face 40 of the upper support member 14, as illustrated in FIG. 9.

Hook 36 of the auxiliary support 20 is then engaged in hooking hole 92 of the mounting bracket 22, followed with the lowering down of the mounting bracket 22 and elongated object 26 assembly until essentially suspended through the auxiliary support 20, as illustrated in FIG. 10. The mounting bracket 22 and elongated object 26 assembly thus secured and freely suspended through the auxiliary support 20, allows a natural alignment by gravity of the corresponding pairs of anchoring holes 44 and 46 and 87 and 88 of the upper support member 14 and mounting bracket 22 respectively. The vertically oriented, anchoring slot holes 44 and 88 allows for a slight vertical distance variation between the static upper support member 14 and the mounting bracket 22 and elongated object 26 assembly. A pair of threaded fastener and nut combinations 86 may then be inserted therethrough and tightly fastened in place, as shown in FIG. 11.

The flexible tying element 24 may then be engaged through the pair of open slots 68 and tied around a portion of the circumference of the elongated object 26 such that the latter is firmly abutting against the lower support member 16, as illustrated in FIG. 12. Finally, the hoist cable is loosened and the U-link 98 is removed. Thus, the elongated object 26 is firmly held in place, with its weight distributed through the auxiliary support member 12 and the upper support member 14.

To remove an elongated object 26, such as the H-beam mentioned above, from its vertical storage position 18 in the storage system 10, the sequence of operations described above may be executed in reverse order.

In an alternate embodiment (not shown), additional pairs of adjacent, elongated open slots are downwardly extending from the upper edge of flange 59 of each upper support members 14 of the storage system 10. The distance between each open slot within a pair being relatively wider than the distance between a pair formed by an anchoring slot hole 44 and anchoring hole 46 provided through flange 59 of an upper support member 14, each open slot within a pair may be equidistantly provided on each side thereof. Thus, the additional pairs of open slots provided along each flange 59 of the plurality of vertically spaced apart upper support members 14 allow the storage of two, or more, relatively shorter elongated objects 26, one above the other within a common vertical storage position 18. The present embodiment allows an optimized usage of the storage space within the storage system 10.

In a variant, the proposed storage system 10 may be used with elongated objects that abut laterally against each other to form a protective wall, for example to shield from explosions caused by dynamite or other explosives. The elongated objects could then be made of concrete or other suitable material.

Although the present invention has been described hereinabove by way of exemplary embodiments thereof, it will be readily appreciated that many modifications are possible in the exemplary embodiments without materially departing from the novel teachings and advantages of this invention.

Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A storage system for storing an elongated object in a substantially vertical orientation relative to a ground surface, the storage system comprising:
    a rack, the rack including a plurality of vertical support columns configured to rest upon the ground surface, a planar first horizontal member supported by the support columns above the ground surface and a planar second horizontal member supported by the support columns above the ground surface higher than the first horizontal member;
    a bracket comprising a first plate portion and a second plate portion that is perpendicular to the first plate portion, wherein the first plate portion is removably fastened to the first horizontal member and the second plate portion is configured to be directly fastened to the elongated object to mount the elongated object to the first horizontal member; and
    a chain secured to and extending between the bracket and the second horizontal member to attach the bracket to the second horizontal member;
    wherein the chain includes a tension adjuster for adjusting a tension of the chain when the bracket is secured to the first horizontal member, wherein when the tension of the chain is increased the storage system is more stabile so that the storage system can withstand wind pressure, small earthquakes, and shocks.

2. The storage system as defined in claim 1, wherein the tension adjuster includes a flexible element mounting bracket, the chain being secured to the flexible element mounting bracket by a fastener, wherein the tension is adjusted to the chain by fastening the fastener to vary a distance between the flexible element mounting bracket and the second horizontal member.

3. The storage system as defined in claim 1, wherein the tension adjuster includes a variable length element provided along the chain.

4. The storage system as defined in claim 1, further comprising a third member supported by the support columns above the ground surface lower than the first horizontal member and a third mounting element securable to both the elongated object and to the third member to mount the elongated object to the third member.

5. The storage system as defined in claim 4, wherein the third mounting element includes a flexible tying element for tying the elongated object to the third member.

6. The storage system as defined in claim 5, wherein the third member includes a third member abutment surface for abutting the elongated object thereagainst when the flexible tying element ties the elongated object to the third member.

7. The storage system as defined in claim 6, wherein the third member defines a pair of spaced apart slots for inserting the tying element thereinto.

8. The storage system as defined in claim 1, wherein the second plate portion of the bracket defines a hoisting aperture for securing a hoist thereto.

9. The storage system as defined in claim 1, wherein the second plate portion of the bracket defines at least one fastening aperture for receiving a fastener therethrough to fasten the second plate portion to the elongated object.

10. The storage system as defined in claim 1, wherein the first plate portion of the bracket defines an anchoring aperture and the first horizontal member defines an anchoring slot, the anchoring slot and the anchoring aperture being aligned with each other when the elongated object is stored to allow fastening of the bracket to the first horizontal member with a fastener.

11. The storage system as defined in claim 1, wherein the first plate portion of the bracket defines an anchoring slot and the first horizontal member defines an anchoring aperture, the anchoring slot and the anchoring aperture being aligned with each other when the elongated object is stored to allow fastening of the bracket to the first horizontal member with a fastener.

12. The storage system as defined in claim 1, further comprising a catwalk extending substantially adjacent to the first horizontal member.

* * * * *